United States Patent
Guo et al.

(10) Patent No.: US 12,424,030 B2
(45) Date of Patent: Sep. 23, 2025

(54) FINGERPRINT RECOGNITION METHOD AND APPARATUS

(71) Applicant: HONOR DEVICE CO., LTD., Shenzhen (CN)

(72) Inventors: Mingjin Guo, Shenzhen (CN); Danhong Li, Shenzhen (CN); Haoxuan Di, Shenzhen (CN); Junlong Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/838,316

(22) PCT Filed: May 5, 2023

(86) PCT No.: PCT/CN2023/092330
§ 371 (c)(1),
(2) Date: Aug. 14, 2024

(87) PCT Pub. No.: WO2024/037056
PCT Pub. Date: Feb. 22, 2024

(65) Prior Publication Data
US 2025/0166419 A1    May 22, 2025

(30) Foreign Application Priority Data

Aug. 18, 2022   (CN) .......................... 202210994157.5

(51) Int. Cl.
*G06V 40/50* (2022.01)
*G06V 10/98* (2022.01)
(Continued)

(52) U.S. Cl.
CPC ............ *G06V 40/50* (2022.01); *G06V 10/993* (2022.01); *G06V 40/1365* (2022.01); *G06V 40/45* (2022.01)

(58) Field of Classification Search
CPC .. G06V 40/50; G06V 40/1365; G06V 10/993; G06V 40/45
See application file for complete search history.

(56) References Cited

U.S. PATENT DOCUMENTS 10,169,639 B2   1/2019   Zhou
10,417,478 B2   9/2019   Zhang et al.
(Continued)

FOREIGN PATENT DOCUMENTS

CN          102254167 A       11/2011
CN          105335731 A        2/2016
(Continued)

*Primary Examiner* — Lixi C Simpson

(57) ABSTRACT

A fingerprint recognition method and apparatus are provided. The method is applied to the field of fingerprint recognition technologies. The method includes: when a first fingerprint image is successfully matched, judging whether matching information of the first fingerprint image satisfies a first preset condition; when the matching information of the first fingerprint image satisfies the first preset condition, judging whether a cumulative update count of a second fingerprint template is greater than a first quantity threshold; when the cumulative update count of the second fingerprint template is greater than the first quantity threshold, judging whether priority information of the second fingerprint template satisfies a second preset condition; and when the priority information of the second fingerprint template satisfies the second preset condition, updating the second fingerprint template with the first fingerprint image. A high-quality fingerprint image is selected through a plurality of judgment conditions to update a fingerprint template library. Matching is performed based on an updated fingerprint template library. This can increase a fingerprint unlocking rate and an unlocking speed, so that user experience in unlocking is improved.

10 Claims, 8 Drawing Sheets

(51) Int. Cl.
*G06V 40/12* (2022.01)
*G06V 40/40* (2022.01)

(56) References Cited

U.S. PATENT DOCUMENTS

| | | | |
|---|---|---|---|
| 10,482,311 | B2 | 11/2019 | Wu et al. |
| 10,528,791 | B1* | 1/2020 | Shanmuga Vadivel ..................... G06V 40/1376 |
| 11,341,362 | B2 | 5/2022 | Jiang |
| 2017/0004351 | A1* | 1/2017 | Kim .................. G06V 40/1365 |
| 2017/0344804 | A1 | 11/2017 | Zhou |
| 2018/0004924 | A1* | 1/2018 | Tieu .................... G06F 21/6218 |
| 2019/0251393 | A1 | 8/2019 | Jiang |
| 2021/0056673 | A1* | 2/2021 | Narasimha-Iyer .... G06T 7/0002 |

FOREIGN PATENT DOCUMENTS

| | | |
|---|---|---|
| CN | 105447454 A | 3/2016 |
| CN | 105868679 A | 8/2016 |
| CN | 106021606 A | 10/2016 |
| CN | 106022290 A | 10/2016 |
| CN | 106127152 A | 11/2016 |
| CN | 106372609 A | 2/2017 |
| CN | 108288050 A | 7/2018 |

* cited by examiner

FINGERPRINT RECOGNITION METHOD AND APPARATUS

This application is the U.S. national phase of International Application No. PCT/CN2023/092330 filed May 5, 2023, which designated the U.S. and claims priority to Chinese patent application CN 202210994157.5 filed Aug. 18, 2022, the entire contents of each of which are hereby incorporated by reference.

TECHNICAL FIELD

This application relates to the field of biological recognition, and specifically, to a fingerprint recognition method and apparatus.

BACKGROUND

With the popularization of a smart terminal, a fingerprint recognition technology has rapidly developed in the field of terminals. Particularly when a user wears a face mask, compared with face unlocking, fingerprint unlocking is indispensable. In a fingerprint unlocking process, a fingerprint template needs to be input in advance for fingerprint unlocking. The fingerprint template plays an important role in fingerprint unlocking. If a fingerprint template input for the first time is low in quality, and is not subsequently updated after input for the first time, user experience may be subsequently affected. Therefore, it is necessary to continuously update and perfect the fingerprint template.

However, most factors considered in a current fingerprint template update method are simple. For example, whether to update the fingerprint template is determined by a quantity of fingerprint templates, which is limited to some extent. Therefore, how to effectively update the fingerprint template becomes a problem to be urgently resolved.

SUMMARY

In view of this, this application provides a fingerprint recognition method and apparatus, a computer-readable storage medium, and a computer program product. A fingerprint template is updated with a plurality of judgment conditions considered, so that a success rate of fingerprint recognition can be increased, and user experience in fingerprint recognition is greatly improved.

According to a first aspect, a fingerprint recognition method is provided. The method is applied to an electronic device. The method includes:
  acquiring a first fingerprint image, and matching the first fingerprint image with a fingerprint template library;
  judging whether the first fingerprint image is successfully matched;
  after the first fingerprint image is successfully matched, obtaining matching information of the first fingerprint image, where the matching information is used to represent a matching degree between the first fingerprint image and a first fingerprint template, and the first fingerprint template is a fingerprint template that is in the fingerprint template library and that is successfully matched with the first fingerprint image;
  determining whether the matching information satisfies a first preset condition;
  when the matching information satisfies the first preset condition, determining whether a first quantity is greater than a first quantity threshold, where the first quantity is used to represent a cumulative update count of a second fingerprint template in the fingerprint template library;
  when the first quantity is greater than the first quantity threshold, judging whether priority information of the second fingerprint template satisfies a second preset condition;
  when the priority information of the second fingerprint template satisfies the second preset condition, obtaining index information of the second fingerprint template; and
  updating the second fingerprint template with the first fingerprint image based on the index information of the second fingerprint template.

The method may be performed by a terminal device or a chip in a terminal device. Based on the foregoing solution, a high-quality fingerprint image is selected through a plurality of judgment conditions to update the fingerprint template library, specifically including: first judging whether the first fingerprint image is successfully matched, and when the first fingerprint image is successfully matched, judging whether the matching information of the first fingerprint image satisfies the first preset condition; then, when the matching information of the first fingerprint image satisfies the first preset condition, judging whether the cumulative update count of the second fingerprint template is greater than the first quantity threshold; next, when the cumulative update count of the second fingerprint template is greater than the first quantity threshold, judging whether the priority information of the second fingerprint template satisfies the second preset condition; and finally, when the priority information of the second fingerprint template satisfies the second preset condition, updating the second fingerprint template with the first fingerprint image. Through the foregoing plurality of judgment conditions, the high-quality fingerprint image can be selected to update the fingerprint template library. In this way, when a user subsequently performs fingerprint unlocking, matching is performed based on an updated fingerprint template library. This can implement fingerprint unlocking faster, and increases a fingerprint unlocking rate and an unlocking speed, so that user experience in unlocking is improved.

In a possible implementation, when the first quantity is greater than the first quantity threshold, the method further includes:
  determining whether a second quantity is less than or equal to a second quantity threshold, where the second quantity is used to represent a recognition failure count of the first fingerprint image during fingerprint matching;
  when the second quantity is less than or equal to the second quantity threshold, determining whether a third quantity is less than a third quantity threshold, where the third quantity is used to represent a total quantity of fingerprint templates currently stored in the fingerprint template library; and
  when the third quantity is less than the third quantity threshold, adding the first fingerprint image to the fingerprint template library.

In a possible implementation, the method further includes:
  when the third quantity is greater than or equal to the third quantity threshold, updating the second fingerprint template with the first fingerprint image.

Therefore, when the first quantity is greater than the first quantity threshold, the second quantity and the third quantity may further be considered, to add or update a fingerprint template.

In a possible implementation, the matching information includes a matching score, a matching area, and a quality score. Whether the matching information satisfies the first preset condition includes: the matching score is greater than a first score threshold, the matching area is greater than an area threshold, and the quality score is greater than a second score threshold.

In a possible implementation, that the priority information of the second fingerprint template satisfies the second preset condition includes:
- a weight value of the second fingerprint template is greater than a weight threshold, a value obtained by automatically adding one to the first quantity is less than a fourth quantity threshold, and a matching success rate of the second fingerprint template is less than a ratio threshold. One is automatically added to the first quantity when whether the first quantity is greater than the first quantity threshold is determined.

In a possible implementation, a fingerprint template update function of the electronic device is on. In other words, the foregoing fingerprint template update process is performed only when the fingerprint template update function is on.

In a possible implementation, the method further includes:
- performing real/fake finger anti-fake judgment on the first fingerprint image.

The determining whether the matching information satisfies a first preset condition includes:
- when the first fingerprint image is of a real finger, determining whether the matching information satisfies the first preset condition.

Therefore, real/fake finger judgment can avoid fingerprint unlocking with a fake finger and improve fingerprint recognition security.

In a possible implementation, the method further includes:
- displaying a first interface, where the first interface includes a first option, and the first option is used to select to turn on or turn off the fingerprint template update function.

Therefore, embodiments of this application further provide a switch option for the fingerprint template update function, for the user to select to turn on or turn off the fingerprint template update function.

According to a second aspect, a fingerprint recognition apparatus is provided, including units configured to perform the method in any implementation of the first aspect. The apparatus may be a terminal (or a terminal device), or a chip in a terminal (or a terminal device). The apparatus includes an input unit, a display unit, and a processing unit.

When the apparatus is the terminal, the processing unit may be a processor, the input unit may be a communication interface, and the display unit may be a graphic processing module and a screen. The terminal may further include a memory. The memory is configured to store computer program code. When the processor executes the computer program code stored in the memory, the terminal is enabled to perform any method in the first aspect.

When the apparatus is the chip in the terminal, the processing unit may be a logic processing unit inside the chip, the input unit may be an input interface, a pin, a circuit, or the like, and the display unit may be a graphic processing unit inside the chip. The chip may further include a memory. The memory may be a memory (for example, a register or a cache) in the chip, or a memory (for example, a read-only memory or a random access memory) located outside the chip. The memory is configured to store computer program code. When the processor executes the computer program code stored in the memory, the chip is enabled to perform the method in any implementation of the first aspect.

According to a third aspect, a computer-readable storage medium is provided. The computer-readable storage medium stores computer program code. When the computer program code is run by a fingerprint recognition apparatus, the apparatus is enabled to perform the method in any implementation of the first aspect.

According to a fourth aspect, a computer program product is provided. The computer program product includes computer program code. When the computer program code is run by a fingerprint recognition apparatus, the apparatus is enabled to perform the method in any implementation of the first aspect.

DESCRIPTION OF EMBODIMENTS

Figure 1:
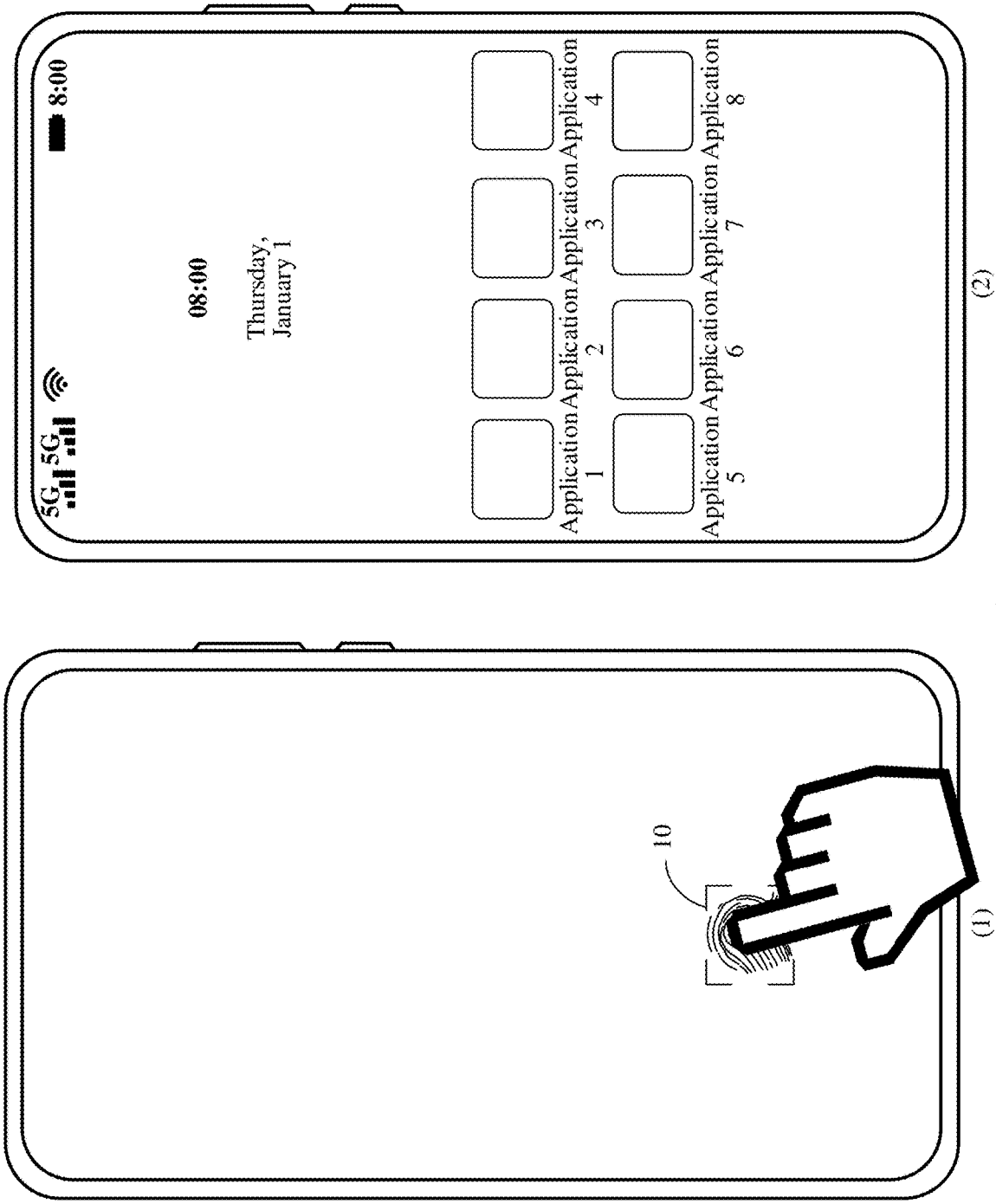
FIG. 1 is an example diagram of an application scenario according to an embodiment of this application.

The following describes technical solutions in embodiments of this application with reference to the accompanying drawings.

A fingerprint recognition method provided in an embodiment of this application may be applied to an electronic device with a fingerprint recognition function. For example, the electronic device may be a mobile phone, a tablet computer, a notebook computer, a wearable device, a multimedia player, an e-book reader, a personal computer, a personal digital assistant (personal digital assistant, PDA), a netbook, an augmented reality (augmented reality, AR) device, or a virtual reality (virtual reality, VR) device. A specific form of the electronic device is not limited in this application.

By way of example but not limitation, when the electronic device is a wearable device, the wearable device may be a general term for wearable devices, such as glasses, gloves, watches, clothing, and shoes, developed by applying wearable technologies in intelligent designs of daily wear. The wearable device is a portable device that is directly worn on a body or integrated into clothes or an accessory of a user, and may acquire biological feature data of the user. The wearable device not only is a hardware device but also realizes powerful functions through software support, data interaction, and cloud interaction. In an implementation, a wearable smart device includes a device, for example, a smartwatch or smart glasses, that is comprehensive in function and large in size and that can perform some or all functions without relying on a smartphone. In another implementation, a wearable smart device may be a device, for example, a smart band including an unlocked touchscreen or a smart jewelry, that focuses on a specific type of application function and needs to be used in cooperation with another device (for example, a smartphone).

An application scenario of fingerprint recognition is not specifically limited in this embodiment of this application, and this embodiment of this application is applied to all scenarios involving recognition with a fingerprint, for example, unlocking, payment, or identity authentication performed by the user using a fingerprint.

This embodiment of this application may be applied to an optical fingerprint recognition scenario. Optical fingerprint recognition mainly uses principles of light reflection and refraction. When a finger presses a screen, the screen is turned on and emits light, the light illuminates a fingerprint, and then the fingerprint is transmitted to a sensor under the screen through reflection and refraction for recognition. The fingerprint recognition scenario is not specifically limited in this embodiment of this application, and embodiments of this application may also be appropriately applied to other fingerprint recognition scenarios, for example, ultrasonic fingerprint recognition and capacitive fingerprint recognition.

It may be understood that a location of a fingerprint module is not specifically limited in this embodiment of this application. For example, if an optical fingerprint recognition technology is used, the fingerprint module may be disposed under the screen (or a touchscreen) of the electronic device, that is, implements in-screen fingerprint recognition. For another example, the fingerprint module may alternatively be disposed on the back or side of the electronic device.

Generally, update of a fingerprint template is important to some extent in a fingerprint unlocking process. Quality of the fingerprint template may directly affect a fingerprint unlocking speed or a fingerprint unlocking rate. If the fingerprint template is not updated, user experience in fingerprint recognition may be affected.

FIG. 1 is a diagram of an application scenario according to an embodiment of this application. For example, the electronic device is a mobile phone. The mobile phone uses in-screen fingerprint unlocking. As shown in (1) in FIG. 1, the user presses a fingerprint unlocking region 10 of the screen to try to perform fingerprint unlocking. After the user presses the fingerprint unlocking region 10, the mobile phone matches an acquired fingerprint with a fingerprint template pre-stored by the user. If matching succeeds, the screen of the mobile phone is successfully unlocked.

It should be understood that the fingerprint unlocking region 10 shown in (1) in FIG. 1 is merely an example for description, and this embodiment of this application is not limited thereto. In fact, the fingerprint unlocking region 10 may be located in another region of the screen, for example, a screen region close to a power button.

It should further be understood that fingerprint unlocking in (1) in FIG. 1 is described using in-screen fingerprint unlocking as an example, and this embodiment of this application is not limited thereto. For example, this embodiment of this application is also applied to back fingerprint unlocking of the mobile phone.

After the fingerprint of the user is successfully matched, a home screen of the mobile phone may be entered. In a possible case, for example, the mobile phone displays an interface shown in (2) in FIG. 1 after successful fingerprint unlocking, where icons of a plurality of applications, for example, an application 1 to an application 8, are displayed on the interface. Certainly, the interface shown in (2) in FIG. 1 is merely a possible case, and this embodiment of this application is not limited thereto.

It should be understood that the scenario in FIG. 1 only schematically describes one application scenario of this application, this does not constitute a limitation on this embodiment of this application, and this application is not limited thereto.

Figure 2:
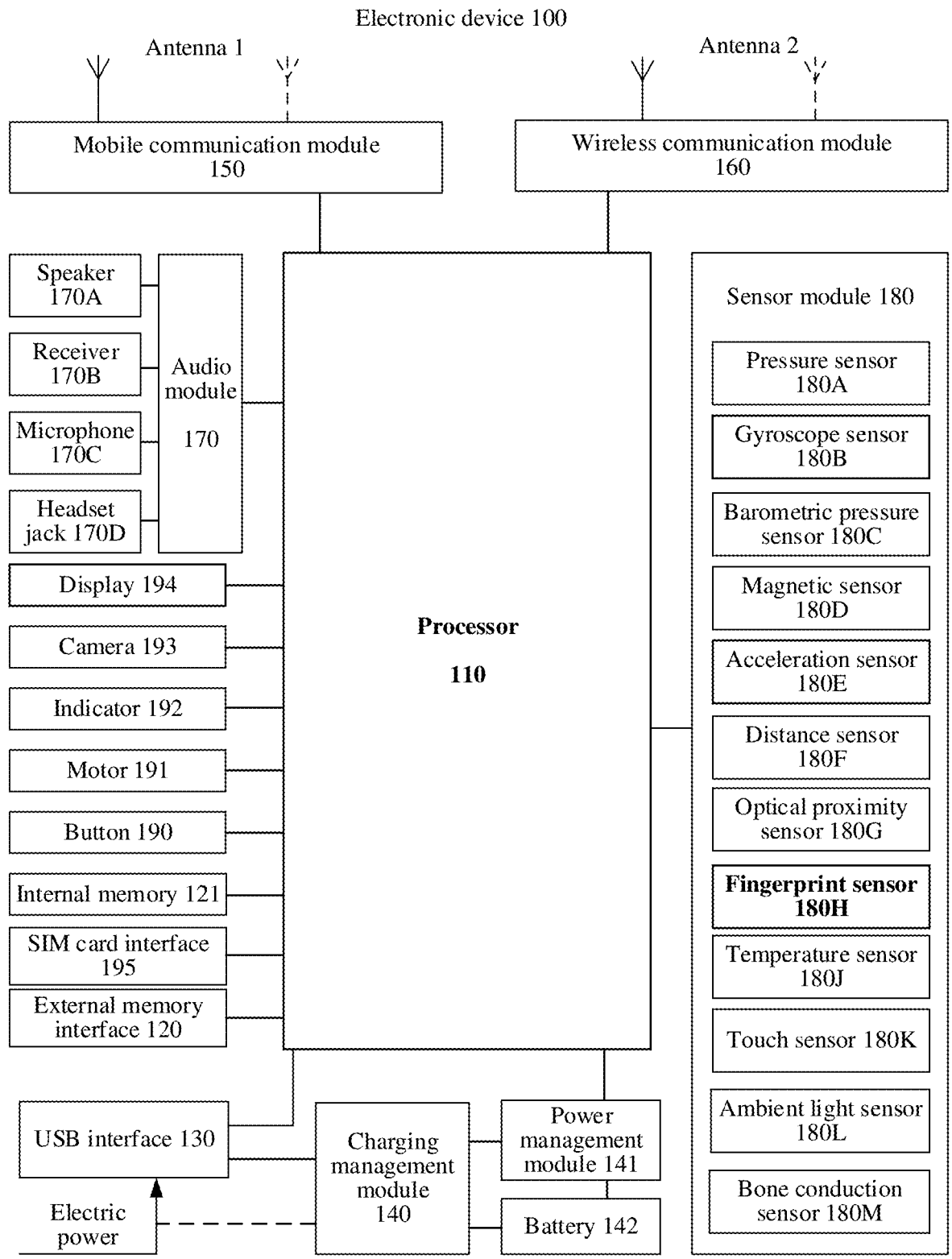
FIG. 2 is a diagram of a hardware system of an electronic device applied to this application.
Figure 3:
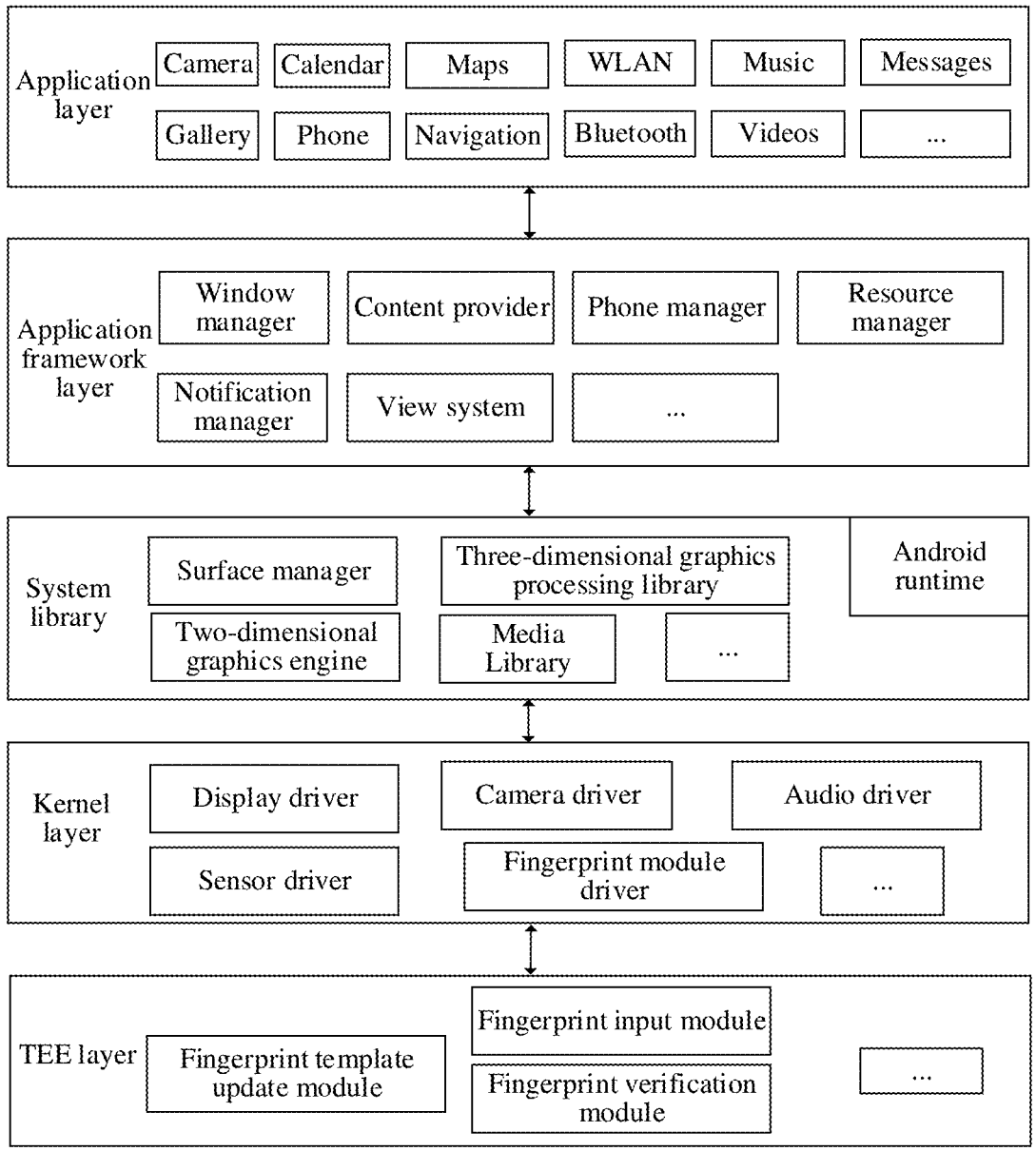
FIG. 3 is a diagram of a software system of an electronic device applied to this application.

The following describes, with reference to FIG. 2 and FIG. 3, a hardware system and a software architecture that are applied to this embodiment of this application.

FIG. 2 shows a hardware system of an electronic device applied to this application.

An electronic device 100 may be a mobile phone, a smartscreen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 2 does not constitute a specific limitation on the electronic device 100. In some other embodiments of this application, the electronic device 100 may include more or fewer components than those shown in FIG. 2, the electronic device 100 may include a combination of some of the components shown in FIG. 2, or the electronic device 100 may include subcomponents of some of the components shown in FIG. 2. For example, the optical proximity sensor 180G shown in FIG. 2 may be optional. The components shown in FIG. 2 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be integrated devices.

In some embodiments, the processor 110 may judge, when a first fingerprint image is successfully matched, whether matching information of the first fingerprint image satisfies a first preset condition; when the matching information of the first fingerprint image satisfies the first preset condition, judge whether a cumulative update count of a second fingerprint template is greater than a first quantity threshold; when the cumulative update count of the second fingerprint template is greater than the first quantity threshold, judge whether priority information of the second fingerprint template satisfies a second preset condition; and when the priority information of the second fingerprint template satisfies the second preset condition, update the second fingerprint template with the first fingerprint image.

The controller may generate an operation control signal based on an instruction operation code and a timing signal, to implement control on instruction fetching and execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

A connection relationship between the modules shown in FIG. 2 is merely an example for description, and does not constitute a limitation on a connection relationship between the modules of the electronic device 100. Optionally, the modules of the electronic device 100 may alternatively use a combination of a plurality of connection manners in the foregoing embodiment.

The electronic device 100 can implement a display function by using the GPU, the display screen 194, and the application processor. The GPU is a microprocessor for image processing and connects the display 194 to the application processor. The GPU is configured to perform mathematical and geometric computation for graphic rendering. The processor 110 may include one or more GPUs that execute program instructions to generate or change display information.

The display 194 may be configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light emitting diodes, QLED). In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may perform algorithm optimization on noise, brightness, and a color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format of red green blue (red green blue, RGB), YUV, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The electronic device 100 may implement an audio function such as music playback and sound recording through the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, or a capacitive pressure sensor. The capacitive pressure sensor may include at least two parallel plates with conductive materials. When force acts on the pressure sensor 180A, capacitance between electrodes changes, and the electronic device 100 determines pressure strength based on a change in the capacitance. When a touch operation is performed on the display 194, the electronic device 100 detects the touch operation based on the pressure sensor 180A. The electronic device 100 may also calculate a touch location based on a detected signal of the pressure sensor 180A. In some embodiments, touch operations performed on a same touch location but with different touch operation strength may correspond to different operation instructions. For example, when a touch operation with touch operation strength less than a first pressure threshold is performed on a short message application icon, an instruction of viewing short messages is executed. When a touch operation with touch operation strength greater than or equal to the first pressure threshold is performed on the short message application icon, an instruction of creating a new short message is executed.

The optical proximity sensor 180G may include, for example, a light-emitting diode (light-emitting diode, LED) and an optical detector, for example, a photodiode. The LED may be an infrared LED. The electronic device 100 emits infrared light through the LED. The electronic device 100 detects infrared reflected light from a nearby object through the photodiode. When reflected light is detected, the electronic device 100 may determine that there is an object near the electronic device 100. When no reflected light is detected, the electronic device 100 may determine that there is no object near the electronic device 100. The electronic device 100 may use the optical proximity sensor 180G to detect whether a user holds the electronic device 100 close to an ear for a call, to automatically turn off a screen to save power. The optical proximity sensor 180G may be further configured to automatically unlock and lock the screen in a holster mode or a pocket mode. It should be understood that the optical proximity sensor 180G in FIG. 2 may be an optional component. In some scenarios, an ultrasonic sensor may be used to replace the optical proximity sensor 180G to detect proximity light.

The fingerprint sensor 180H is configured to acquire a fingerprint. The electronic device 100 may use a feature of the acquired fingerprint to implement functions such as unlocking, accessing an application lock, photographing, and receiving a call. The fingerprint sensor 180H may be implemented by a fingerprint module. In some embodiments, the fingerprint module is an optical fingerprint module.

The touch sensor 180K is also referred to as a touch device. The touch sensor 180K may be disposed on the display 194. The touch sensor 180K and the display 194 form a touchscreen, and the touchscreen is also referred to as a touch control screen. The touch sensor 180K is configured to detect a touch operation performed on or near the touch sensor. The touch sensor 180K may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The button 190 includes a power button and a volume button. The button 190 may be a mechanical button, or may be a touch button. The electronic device 100 may receive a key input signal and implement a function related to the key input signal.

The motor 191 may generate a vibration. The motor 191 may be configured to provide an incoming call prompt, and may be further configured to provide touch feedback. The motor 191 may generate different vibration feedback effects for touch operations performed on different applications. The motor 191 may also generate different vibration feedback effects for touch operations performed on different regions of the display 194. Different application scenarios (for example, a time reminder, information receiving, an alarm clock, and a game) may correspond to different vibration feedback effects. Touch vibration feedback effects may be customized.

The hardware system of the electronic device 100 is described in detail above. A software system of the electronic device 100 is described below. The software system may use a layered architecture, an event-driven architecture, a microkernel architecture, a microservice architecture, or a cloud architecture. The layered architecture is used as an example in this embodiment of this application to describe an example of the software system of the electronic device 100.

As shown in FIG. 3, the software system using a layered architecture is divided into several layers, and each layer has a clear role and task. The layers communicate with each other through a software interface. In some embodiments, the software system may be divided into five layers: an application layer, an application framework layer, an Android runtime (Android Runtime) and system library, a kernel layer, and a trusted execution environment (trusted execution environment, TEE) layer from top to bottom.

The application layer may include applications such as Camera, Gallery, Calendar, Phone, Maps, Navigation, WLAN, Bluetooth, Music, Videos, and Messages.

The application framework layer provides an application programming interface (application programming interface, API) and a programming framework for the applications at the application layer. The application framework layer may include some predefined functions.

For example, the application framework layer includes a window manager, a content provider, a view system, a phone manager, a resource manager, and a notification manager.

The window manager is configured to manage a window application. The window manager may obtain a display size, judge whether there is a status bar, perform screen locking, and take a screenshot.

The content provider is configured to store and obtain data, and make the data accessible to an application. The data may include a video, an image, audio, calls made and answered, a browsing history and a bookmark, and a phone book.

The view system includes visual controls such as a text display control and a picture display control. The view system may be configured to construct an application. A display interface may include one or more views. For example, a display interface including an SMS message notification icon may include a text display view and a picture display view.

The phone manager is configured to provide a communication function for the electronic device 100, for example, management of a call status (answering or declining).

The resource manager provides various resources for an application, such as a localized string, an icon, a picture, a layout file, and a video file.

The notification manager enables an application to display notification information in the status bar, which may be used to convey a notification-type message and may automatically disappear after a short stay without user interaction. For example, the notification manager is configured to provide a notification of download completion and a message notification. The notification manager may further manage a notification that appears in the status bar at a top of the system in a form of a graph or scroll bar text, for example, a notification of an application running in the background. The notification manager may further manage a notification that appears on the screen in a form of a dialog window. For example, text information is displayed in the status bar, a prompt tone is made, the electronic device vibrates, or an indicator light blinks.

The Android runtime includes a kernel library and a virtual machine. The Android runtime is responsible for scheduling and managing an Android system.

The kernel library includes two parts: one part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

A system library may include a plurality of function modules, for example, a surface manager (surface manager), a media library (Media Libraries), a three-dimensional graphics processing library (for example, an open graphics library for embedded systems (open graphics library for embedded systems, OpenGL ES)), and a 2D graphics engine (for example, a skia graphics library (skia graphics library, SGL)).

The surface manager is configured to manage a display subsystem and provide fusion of 2D and 3D layers for a plurality of applications.

The media library supports playback and recording of audio in a plurality of formats, playback and recording of videos in a plurality of formats, and still image files. The media library may support a variety of audio and video encoding formats, for example, MPEG4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, composition, and layer processing.

The two-dimensional graphics engine is a drawing engine for 2D drawing.

The kernel layer is a layer between hardware and software. The kernel layer may include drive modules such as a fingerprint module driver, a display driver, a camera driver, an audio driver, and a sensor driver.

The TEE layer may provide a security service for the Android system. The TEE layer is configured to perform various biometric recognition algorithms. The TEE layer is usually configured to perform key operations: (1) mobile payment: fingerprint verification, PIN code input, and the like; (2) secure storage of confidential data such as a private key and a certificate; and (3) content including: digital rights protection, digital rights management, or the like.

In some possible embodiments, the TEE layer includes a fingerprint input module, a fingerprint verification module, and a fingerprint template update module. Optionally, the fingerprint template update module may be independently disposed at the TEE layer (for example, as shown in FIG. 3), or may be located in the fingerprint verification module. This is not specifically limited in this embodiment of this application. In this embodiment of this application, the fingerprint template update module is configured to update a fingerprint template.

In some possible examples, the fingerprint template update module is configured to perform the fingerprint recognition method according to this embodiment of this application.

For example, the fingerprint module is invoked by the fingerprint module driver in the kernel layer to acquire fingerprint data, and then the acquired fingerprint data is transmitted to the TEE layer for processing.

It should be understood that the foregoing uses an example to describe the diagram of the structure of the electronic device based on FIG. 2, and uses an example to describe the diagram of the software architecture in this embodiment of this application based on FIG. 3. However, this embodiment of this application is not limited thereto.

The following describes, with reference to FIG. 4 to FIG. 7, the fingerprint recognition method according to this embodiment of this application. It may be understood that the following fingerprint recognition method may be implemented in an electronic device (for example, the electronic device shown in FIG. 2) with the foregoing hardware structure.

Figure 4:
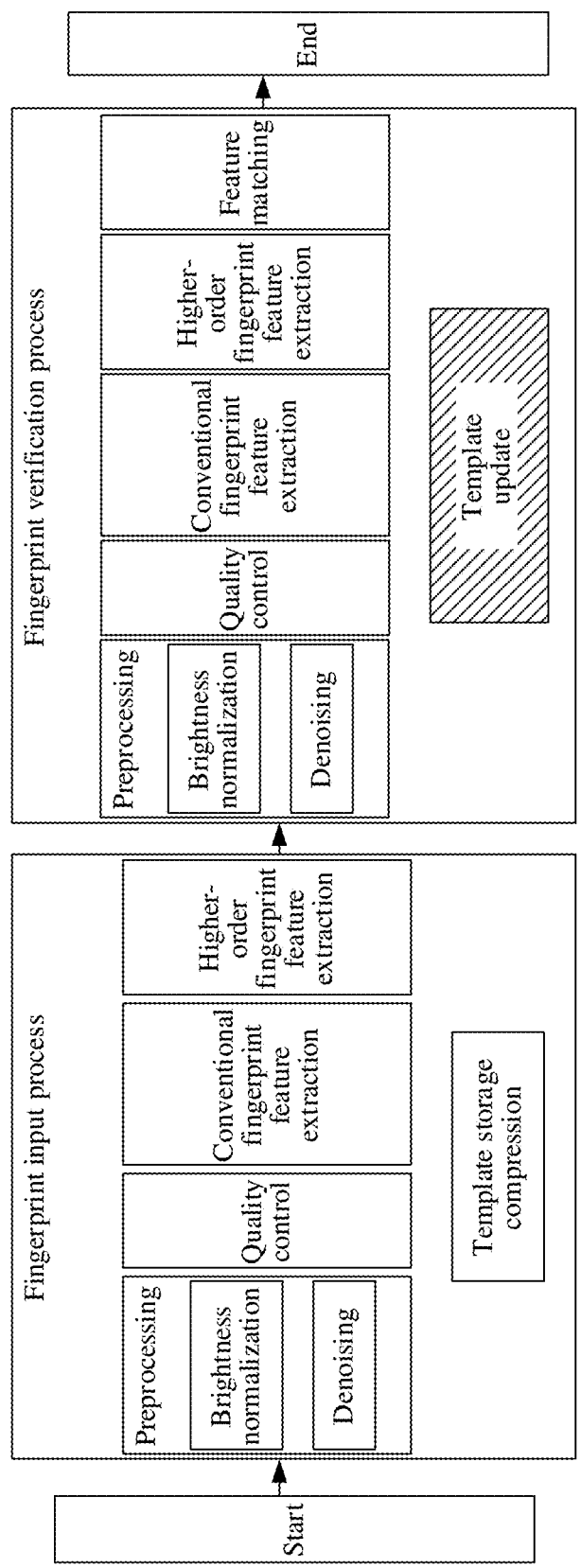
FIG. 4 is a schematic block diagram of a global process of fingerprint recognition according to an embodiment of this application.

FIG. 4 is a schematic block diagram of a global process of fingerprint recognition. As shown in FIG. 4, fingerprint recognition usually includes a fingerprint input process and a fingerprint verification process. For example, the fingerprint input process may be implemented by the fingerprint input module in FIG. 3, and the fingerprint verification process may be implemented by the fingerprint verification module and the fingerprint template update module in FIG. 3.

The fingerprint input process may be understood as a process of preprocessing an acquired fingerprint image of a user, performing feature extraction based on a preprocessed fingerprint image, and finally storing an extracted fingerprint feature as a fingerprint template.

For example, the fingerprint input process usually involves the following processing processes: preprocessing (including brightness normalization, denoising, and the like), quality control, conventional fingerprint feature extraction, higher-order fingerprint feature extraction, and template compression storage.

Preprocessing is an image processing process of performing brightness normalization, denoising, and the like on the acquired fingerprint image.

Denoising means performing image denoising processing on the fingerprint image to remove noise interference from the fingerprint image. A denoising method is not specifically limited in this embodiment of this application. For example, the denoising method is wavelet transform or bilateral filtering.

It should be understood that the foregoing merely uses an example in which preprocessing includes brightness normalization and denoising for description, and this embodiment of this application is not limited thereto. In fact, preprocessing may include other processing operations such as filtering processing, image enhancement, and binarization processing.

Quality control means judging image quality of the preprocessed fingerprint image, where a low-quality fingerprint image is filtered out, and a high-quality fingerprint image is obtained, to input the high-quality fingerprint image.

Conventional fingerprint feature extraction means preliminarily extracting a feature of a fingerprint based on a fingerprint image obtained through denoising. A conventional fingerprint feature may be understood as an overall fingerprint feature (or a global feature).

Higher-order fingerprint feature extraction means preliminarily extracting a fingerprint detail feature point from a detailed fingerprint map. A higher-order fingerprint feature may be understood as a local feature more detailed than the conventional fingerprint feature.

Template compression storage is a process of storing the extracted fingerprint feature. Generally, an extraction result of the fingerprint feature is stored as a feature template.

The fingerprint verification process may be understood as a process of preprocessing a to-be-verified fingerprint image after the to-be-verified fingerprint image is acquired, performing feature extraction based on a preprocessed to-be-verified fingerprint image, and finally matching an extracted to-be-verified fingerprint feature with the fingerprint template. In this embodiment of this application, the fingerprint verification process further includes template update. Template update is a process of updating or adding, when a specific preset condition is satisfied, a fingerprint template based on a fingerprint image that passes verification.

For example, the fingerprint verification process involves the following processing processes: preprocessing (including brightness normalization, denoising, and the like), quality control, conventional fingerprint feature extraction, higher-order fingerprint feature extraction, feature matching, and template update.

For descriptions about preprocessing, denoising, quality control, conventional fingerprint feature extraction, and higher-order fingerprint feature extraction, refer to the descriptions in the fingerprint input process. For brevity, details are not described herein again.

Feature matching means matching a feature of the to-be-verified fingerprint image with a fingerprint feature stored in the fingerprint template.

It should be understood that the schematic block diagram of the process shown in FIG. 4 is merely an example for description, and this embodiment of this application is not limited thereto.

Figure 5:
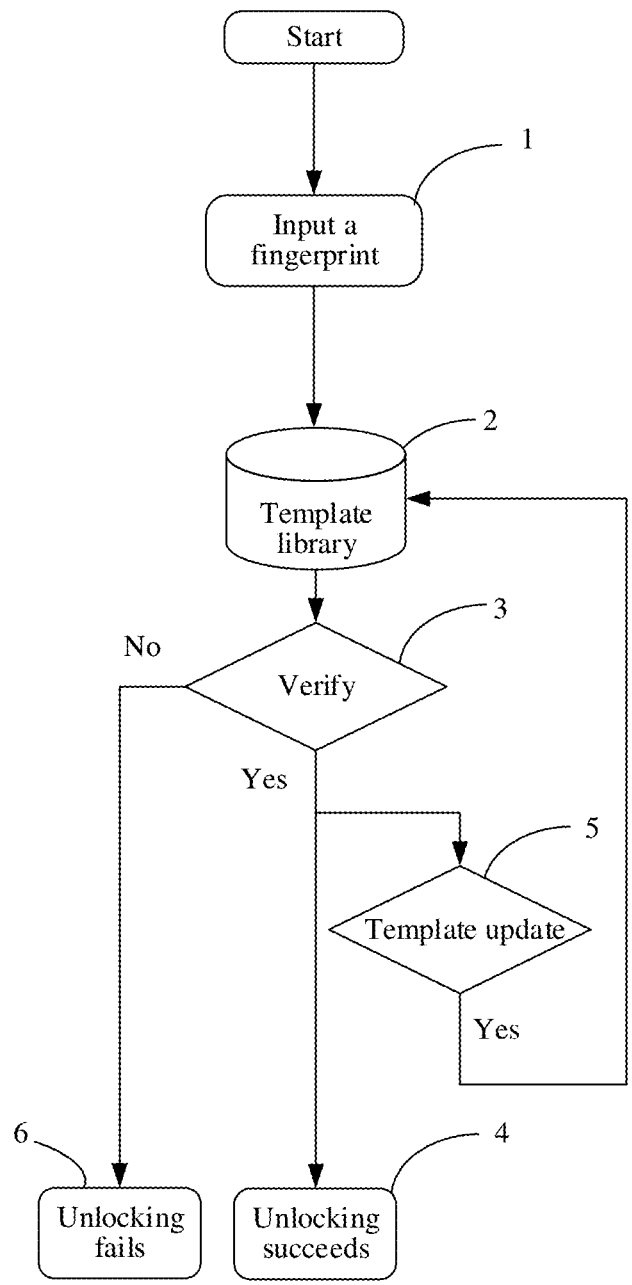
FIG. 5 is a schematic flowchart of fingerprint unlocking according to an embodiment of this application.

The following uses a fingerprint unlocking scenario to briefly describe, with reference to FIG. 5, a position of a template update function in a fingerprint recognition process. It should be understood that in FIG. 5, the fingerprint unlocking scenario is used as an example for illustration herein, but this embodiment of this application is not limited thereto. For example, fingerprint recognition may also be applied to a fingerprint payment scenario.

As shown in FIG. 5, the fingerprint recognition process includes the following steps.

Step 1: Input a fingerprint.

Inputting the fingerprint may be understood as a process of acquiring a fingerprint feature of a user. For example, in an optical fingerprint scenario, the user inputs the fingerprint by pressing a fingerprint unlocking region.

Step 2: Store a feature of a fingerprint image to a fingerprint template library.

The fingerprint template library may include one or more fingerprint templates.

It may be understood that an upper limit of a quantity of fingerprint templates stored in the fingerprint template library may be determined by implementation of an electronic device, which is not specifically limited. For example, a maximum of five fingerprints may be input to the fingerprint template library.

Step 3: Verify (or match) a to-be-verified fingerprint image based on the fingerprint template stored in the fingerprint template library.

If the to-be-verified fingerprint image passes verification, step 4 and step 5 are performed; or if the to-be-verified fingerprint image does not pass verification, step 6 is performed.

Step 4: Unlocking succeeds.

When the fingerprint input by the user is successfully matched with the fingerprint template stored in the fingerprint template library, the electronic device is successfully unlocked.

Step 5: Judge whether to perform template update.

If the fingerprint input by the user is successfully verified, whether to perform template update is judged. In this embodiment of this application, a plurality of judgment factors are considered to judge whether to perform template update. A specific process is described in detail later with reference to FIG. 6. If template update is to be performed, returning to the template library is performed to update the fingerprint template stored in the template library.

Step 6: Unlocking fails.

It should be understood that the process shown in FIG. 5 is merely an example for description, and this embodiment of this application is not limited thereto.

Figure 6:
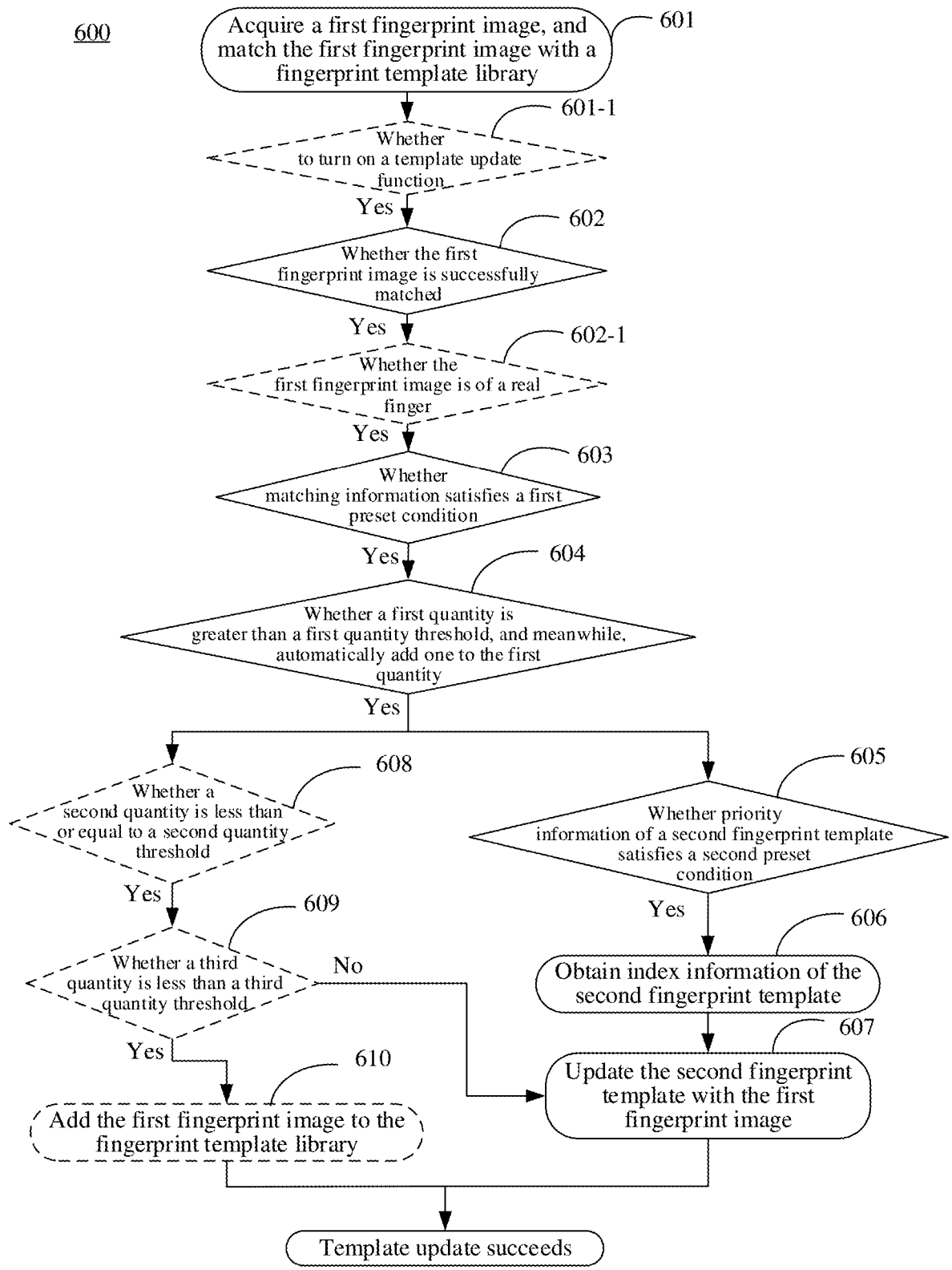
FIG. 6 is a schematic flowchart of a fingerprint recognition method according to an embodiment of this application.

The following describes a schematic logical process of fingerprint template update with reference to FIG. 6. It should be understood that a method 600 shown in FIG. 6 may be implemented in combination with a method in FIG. 5, or may be implemented alone, which is not specifically limited. As shown in FIG. 6, the method 600 includes the following steps.

Step 601: Acquire a first fingerprint image, and match the first fingerprint image with a fingerprint template library.

The first fingerprint image is generally used as a to-be-verified fingerprint image or a to-be-matched fingerprint image. For example, when a user performs fingerprint unlocking, the first fingerprint image is an image acquired when the user presses a fingerprint unlocking region, for example, as shown in (1) in FIG. 1, an image acquired when the user presses a fingerprint unlocking region 10 with a finger.

Optionally, matching the first fingerprint image with the fingerprint template library includes: matching an extracted feature of the first fingerprint image with a feature of a fingerprint template stored in the fingerprint template library.

Optionally, the fingerprint template library includes one or more fingerprint templates. The fingerprint template stored in the fingerprint template library is input by the user in advance. In this embodiment of this application, the fingerprint template library may be updated based on a fingerprint image that passes verification.

Optionally, the fingerprint templates stored in the fingerprint template library may be arranged in order of high to low priorities of the fingerprint templates. For example, when the first fingerprint image is matched with the fingerprint template library, matching may be performed in order of high to low priorities of the fingerprint templates until matching succeeds.

It may be understood that a fingerprint feature matching algorithm is not specifically limited in this embodiment of this application. A person skilled in the art may use a current fingerprint feature matching algorithm to implement a process of matching the first fingerprint image with the fingerprint template.

Step 602: Judge whether the first fingerprint image is successfully matched.

In other words, after matching between the first fingerprint image and the fingerprint template library ends, whether the first fingerprint image is successfully matched needs to be judged. It is necessary to perform a subsequent judgment process for template update only if the first fingerprint image is successfully matched. If the first fingerprint image is not successfully matched, it indicates that the first fingerprint image is not a valid fingerprint or a high-quality fingerprint. Certainly, successful matching of the first fingerprint image only means that the subsequent judgment process may be performed, and whether to perform template update is specifically determined by another judgment condition below. In other words, successful matching of the first fingerprint image is one of preconditions for template update.

For example, that the first fingerprint image is successfully matched means that the first fingerprint image passes verification performed with a feature of a specific fingerprint template (for example, a first fingerprint template) in the fingerprint template library.

Step 603: After the first fingerprint image is successfully matched, obtain matching information of the first fingerprint image, and determine (or judge) whether the matching information satisfies a first preset condition, where the matching information is used to represent a matching degree (or a similarity) between the first fingerprint image and the first fingerprint template, and the first fingerprint template is a fingerprint template that is in the fingerprint template library and that is successfully matched with the first fingerprint image, or the first fingerprint template is a fingerprint template that is in the fingerprint template library and that has a highest similarity or a largest overlapping region with the first fingerprint image.

Optionally, the matching information includes one or more of the following: a matching score, a matching area, and a quality score.

The matching score is a score given when the first fingerprint image is matched with the fingerprint template library. For example, the matching score between the first fingerprint image and the first fingerprint template is 90%.

The matching area is an area of feature points that overlap when the first fingerprint image is matched with the first fingerprint template. For example, an overlapping region between the first fingerprint image and the first fingerprint template is 95%.

The quality score is used to represent a quality mark of the first fingerprint image. Optionally, the quality score is given in a dimension including but not limited to the following factors: a resolution of the fingerprint image, overall quality of the fingerprint image, and local quality of the fingerprint image. For example, if a hundred-mark system is used for scoring, the quality score of the first fingerprint image is 92.

It should be understood that the foregoing content included in the matching information is merely an example for description, and this embodiment of this application is not limited thereto. In fact, the matching information may further include another indicator used to represent the fingerprint matching degree.

Specific content of the first preset condition may be correspondingly set based on the content included in the matching information. For example, when the matching information includes the matching score, the matching area, and the quality score, that the matching information satisfies the first preset condition includes: the matching score is greater than a first score threshold, the matching area is greater than an area threshold, and the quality score is greater than a second score threshold.

For example, judging whether the matching information satisfies the first preset condition includes: judging whether the matching score is greater than the first score threshold, whether the matching area is greater than the area threshold, and whether the quality score is greater than the second score threshold.

It should be understood that the example about that the matching information satisfies the first preset condition is merely an example for description, and this embodiment of this application is not limited thereto. In fact, a person skilled in the art may use another evaluation indicator to define the matching information or define whether the matching information satisfies the first preset condition.

After the first fingerprint image is successfully matched with the first fingerprint template, real/fake finger judgment may further be performed. Step 603 continues to be performed only if the first fingerprint image is of a real finger.

Optionally, the method 600 further includes step 602-1: After the first fingerprint image is successfully matched with the fingerprint template, judge whether the first fingerprint image is of the real finger; and if it is determined that the first fingerprint image is of the real finger, determine whether the matching information satisfies the first preset condition.

Real/fake finger judgment can avoid fingerprint unlocking with a fake finger and improve fingerprint recognition security. For example, the fake finger is a finger manufactured or faked using another technology, to fake the real finger.

It may be understood that a specific manner for real/fake finger judgment is not limited in this embodiment of this application. For example, an anti-fake result module may be used to verify whether the fingerprint image is real or fake.

The matching information is also one of the preconditions for fingerprint template update. Whether the matching information satisfies the first preset condition is judged to determine whether to perform step 604. When the matching information satisfies the first preset condition, step 604 is performed; or when the matching information does not satisfy the first preset condition, step 604 is not performed.

Step 604: When the matching information satisfies the first preset condition, determine (or judge) whether a first quantity is greater than a first quantity threshold, where the first quantity is used to represent a cumulative update count of a second fingerprint template in the fingerprint template library.

In addition, one may be automatically added to the first quantity when whether the first quantity is greater than the first quantity threshold is determined. It may be understood that an example in which one is added to the first quantity when the matching information satisfies the first preset condition is used herein only for description.

The first quantity may be understood as a statistical cumulative update count of the second fingerprint template.

For example, whether a cumulative update count of a specific template in the fingerprint template library is greater than a specified threshold (for example, the first quantity threshold) may be judged. If the cumulative update count of the second fingerprint template exceeds the specified threshold, it is considered that the second fingerprint template actually needs to be updated.

Logic of judging whether the first quantity is greater than the first quantity threshold is set herein for a purpose that a subsequent related process of template update is performed only when the first quantity is greater than the first quantity threshold, so that frequent fingerprint template update can be avoided.

Step 605: When the first quantity is greater than the first quantity threshold, judge whether priority information of the second fingerprint template satisfies a second preset condition.

It should be noted that each fingerprint template in the fingerprint template library has corresponding priority information. The priority information of each fingerprint template may be comprehensively considered or evaluated based on different factors. For example, the priority information of the fingerprint template may be determined based on one or more of the following: a weight value of the fingerprint template, a cumulative update count of the fingerprint template, and a matching success rate (or a matching success ratio) of the fingerprint template.

The weight value of the fingerprint template may be determined based on a quantity of times the fingerprint template is matched. For example, every time when a fingerprint of the user is acquired for unlocking or matching, if the quantity of times the fingerprint template is matched is larger, a weight corresponding to the fingerprint template is higher; or if the quantity of times the fingerprint template is matched is small and even is never matched, a weight corresponding to the fingerprint template is lower.

The cumulative update count of the fingerprint template is determined by a frequency at which the fingerprint template is updated or replaced. The matching success rate of the fingerprint template is a proportion of successful matches of the fingerprint template in last N matches. For example, if the fingerprint template is recently matched for eight times, but a quantity of successful matches with the fingerprint image is only two, a value of the matching success rate of the fingerprint template is 25%.

Optionally, in a possible implementation, that the priority information of the second fingerprint template satisfies the second preset condition includes: a weight value of the second fingerprint template is greater than a weight threshold, a value obtained by automatically adding one to the first quantity is less than a fourth quantity threshold, and a matching success rate of the second fingerprint template is less than a ratio threshold. In addition, automatic addition of one to the first quantity herein is mentioned in step 604.

In other words, when it is determined that the weight value of the second fingerprint template is greater than the weight threshold, the first quantity is less than the fourth quantity threshold, and the matching success rate of the second fingerprint template is less than the ratio threshold, it may be determined that the second fingerprint template is a low-priority template.

It should be noted that setting the second preset condition herein is for finding the low-priority template in the fingerprint templates and updating the low-priority template. For example, the low-priority template is a fingerprint template that is frequently matched with the fingerprint image in a fingerprint matching process and that has a low matching success rate and a cumulative update count less than a predetermined threshold (for example, the fourth quantity threshold). It may be understood that the descriptions about the second preset condition and the priority information are merely example descriptions, and this embodiment of this application is not limited thereto.

Optionally, if it is determined herein that the second fingerprint template does not satisfy the second preset condition, priority information of another fingerprint template in the fingerprint template library may be judged until the low-priority fingerprint template is found. Optionally, if there are a plurality of low-priority fingerprint templates in the fingerprint template library, the fingerprint template with a lowest priority may be updated.

Optionally, in an extreme circumstance, if no low-priority fingerprint template is found from the fingerprint template library, the first fingerprint template may be updated with the first fingerprint image, that is, the fingerprint template successfully matched with the first fingerprint image is updated.

Step 606: When the priority information of the second fingerprint template satisfies the second preset condition, obtain index information of the second fingerprint template.

Optionally, the index information of the second fingerprint template includes an identifier of the second fingerprint template. The identifier may be in a form of an ID or an index (index). The corresponding second fingerprint template may be found from the fingerprint template library based on the identifier.

Optionally, each fingerprint template stored in the fingerprint template library has corresponding index information.

Step 607: Update the second fingerprint template with the first fingerprint image based on the index information of the second fingerprint template.

"Update" may be understood as "replace". For example, a fingerprint feature stored in the second fingerprint template in the fingerprint template library is replaced with a feature of the first fingerprint image, that is, the fingerprint feature of the first fingerprint image is stored in the fingerprint template library as the second fingerprint template.

In this embodiment of this application, a plurality of factors are considered to determine whether to update the fingerprint template. First, whether the first fingerprint image is successfully matched is judged, and when the first fingerprint image is successfully matched, whether the matching information of the first fingerprint image satisfies the first preset condition is judged. Then, when the matching information of the first fingerprint image satisfies the first preset condition, whether the cumulative update count of the second fingerprint template is greater than the first quantity threshold is judged. Next, when the cumulative update count of the second fingerprint template is greater than the first quantity threshold, whether the priority information of the second fingerprint template satisfies the second preset condition is judged. Finally, when the priority information of the second fingerprint template satisfies the second preset condition, the second fingerprint template is updated with the first fingerprint image. Through the foregoing plurality of judgment conditions, a high-quality fingerprint image can be selected to update the fingerprint template library. In this way, when the user subsequently performs fingerprint unlocking, matching is performed based on an updated fingerprint template library. This can implement fingerprint unlocking faster, and increases a fingerprint unlocking rate and an unlocking speed, so that user experience in unlocking is improved. Furthermore, compared with a fingerprint template update-free fingerprint recognition process, the fingerprint recognition method according to this embodiment of this application can significantly reduce a false rejection rate (false rejection rate, FRR) of fingerprint recognition.

Optionally, in a possible embodiment, before the second fingerprint template is updated with the first fingerprint image, an upper limit of a quantity of fingerprint templates may be used as a factor considered. For example, if the quantity of fingerprint templates stored in the fingerprint template library reaches the upper limit of the quantity of fingerprint templates, the second fingerprint template is updated with the first fingerprint image. If the quantity of fingerprint templates stored in the fingerprint template library does not exceed the upper limit of the quantity of fingerprint templates, the first fingerprint image is added to the fingerprint template library.

It may be understood that it is uniformly noted herein that a plurality of judgment factors or features considered for fingerprint template update in this embodiment of this application may be combined for use. This is not specifically limited in this embodiment of this application.

The foregoing describes one embodiment (including judging the priority information of the second fingerprint template and updating the second fingerprint template) in which the first quantity is greater than the first quantity threshold. The following describes another embodiment in which the first quantity is greater than the first quantity threshold.

Optionally, in an embodiment, when the first quantity is greater than the first quantity threshold, the method 600 further includes the following steps.

Step 608: Determine (or judge) whether a second quantity is less than or equal to a second quantity threshold, where the second quantity is used to represent a recognition failure count of the first fingerprint image during fingerprint matching.

Step 609: When the second quantity is less than or equal to the second quantity threshold, determine (or judge) whether a third quantity is less than a third quantity threshold, where the third quantity is used to represent a total quantity of fingerprint templates currently stored in the fingerprint template library.

When the third quantity is less than the third quantity threshold, step 610 is performed (specific content of step 610 is described later); or when the third quantity is greater than or equal to the third quantity threshold, step 607 is performed, that is, the second fingerprint template is updated with the first fingerprint image.

The second quantity may be understood based on the following example: when the user performs unlocking through pressing, matching with a fingerprint template succeeds after a plurality of pressing operations, and a failure count from the start of pressing to successful matching is the second quantity.

The third quantity is the total quantity of fingerprint templates currently stored in the fingerprint template library. The third quantity threshold may be determined by an upper limit of fingerprint templates that can be stored in an electronic device. A value of the third quantity threshold is not specifically limited in this embodiment of this application.

Optionally, in an embodiment, the method 600 further includes step 610: When the third quantity is less than the third quantity threshold, add the first fingerprint image to the fingerprint template library.

For example, when the first quantity is greater than the first quantity threshold, if it is determined that the recognition failure count (corresponding to the second quantity) is less than or equal to a predetermined threshold (for example, the second quantity threshold), whether the quantity of fingerprint templates (corresponding to the third quantity) is less than a predetermined threshold (for example, the third quantity threshold) continues to be judged. If the quantity of fingerprint templates is not less than (that is, greater than or equal to) the predetermined threshold, the second fingerprint template is updated with the first fingerprint image; or if the quantity of fingerprint templates is less than the predetermined threshold, the first fingerprint image is added to the fingerprint template library.

Before the foregoing fingerprint template update method is performed, whether a fingerprint template update function of the electronic device is on may be first judged. If the fingerprint template update function is on, the foregoing fingerprint template update method is performed. In this embodiment of this application, the fingerprint template update function is on by default.

Optionally, in a possible embodiment, the method 600 further includes the following step.

Step 601-1: Determine whether to turn on the fingerprint template update function.

Judging whether the first fingerprint image is successfully matched includes:

when the fingerprint template update function is on, judging whether the first fingerprint image is successfully matched.

For example, before whether the first fingerprint image is successfully matched is judged, whether the fingerprint template update function of the electronic device is on may be first judged. If the fingerprint template update function is on, whether the first fingerprint image is successfully matched continues to be judged.

It should be understood that in FIG. 6, an example in which step 601-1 is performed before step 602 is used for description, but this embodiment of this application is not limited thereto. For example, step 601-1 may alternatively be performed after step 602 and before step 603. For another example, if step 602-1 is included, step 601-1 may be performed before step 602-1, or may be performed after step 602-1. This is not specifically limited.

In this embodiment of this application, the fingerprint template update function may be solidified in a terminal, and does not need to be manually turned on by the user, or may be manually turned on or turned off by the user by providing an option. Optionally, this embodiment of this application further provides a switch option for the fingerprint template update function, for the user to select to turn on or turn off the fingerprint template update function.

Optionally, the method further includes: displaying a first interface. The first interface includes a first option. The first option is used to select to turn on or turn off the fingerprint template update function.

The first interface is a fingerprint setting interface. It may be understood that how to enter the first interface is not specifically limited in this embodiment of this application. For example, the fingerprint setting interface may be entered through a setting application. For another example, the fingerprint setting interface may be entered through a fingerprint-related application.

For example, the switch option (corresponding to the first option) for the fingerprint template update function may be added to the fingerprint setting interface.

Figure 7:
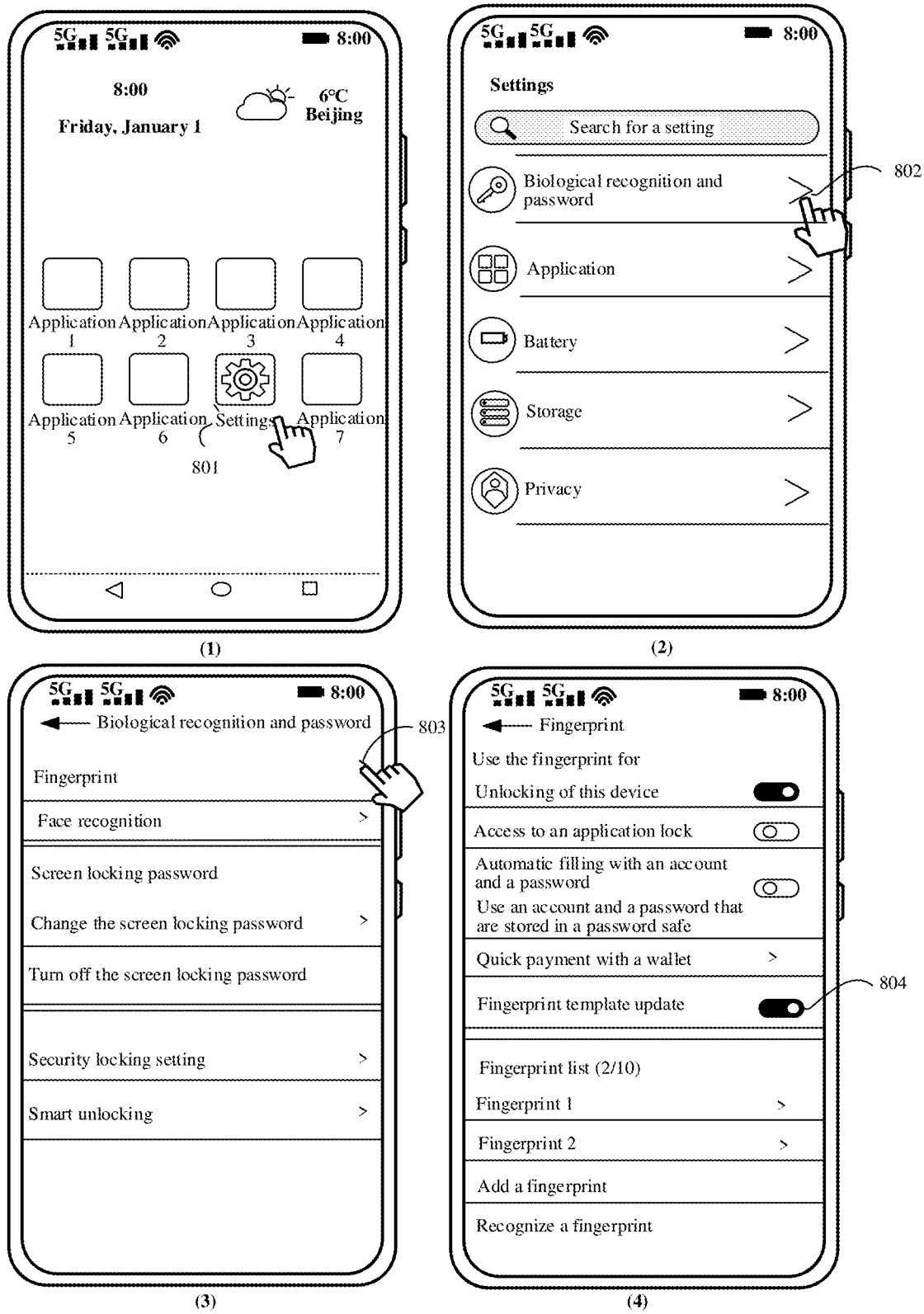
FIG. 7 is an example diagram of an interface according to an embodiment of this application.

FIG. 7 is an example diagram of an interface according to an embodiment of this application. As shown in (1) in FIG. 7, the user taps "Settings" 801 to enter a setting interface, for example, an interface shown in (2) in FIG. 7. It may be understood that the interface shown in (1) in FIG. 7 may further include an icon of another application, for example, an application 1 to an application 7.

As shown in (2) in FIG. 7, the interface includes a biological device and password control 802. It may be understood that the interface shown in (2) in FIG. 7 may further include another setting function, for example, an application setting, a battery setting, a storage setting, and a privacy setting shown in (2) in FIG. 7.

It may be understood that the setting options shown in (2) in FIG. 7 are merely examples of some setting functions, and this embodiment of this application is not limited thereto. It should be further understood that (2) in FIG. 7 further shows a setting search bar, and the user may search for a function setting fast through the setting search bar.

When the user taps the biological device and password control 802, an interface shown in (3) in FIG. 7 is entered. As shown in (3) in FIG. 7, the interface includes a fingerprint setting control 803.

Optionally, in addition to the fingerprint setting control 803, (3) in FIG. 7 may further include a face recognition setting control, a screen locking password management control (including "Change the screen locking password" and "Turn off the screen locking password"), a security locking setting control, and a smart unlocking control. It should be understood that a biological recognition and password option shown in (3) in FIG. 7 is merely an example for description, and this embodiment of this application is not limited thereto.

After the user taps the fingerprint setting control 803, an interface shown in (4) in FIG. 7 is displayed. As shown in (4) in FIG. 7, the interface includes a fingerprint template update option 804. The user may tap the fingerprint template update option 804 to turn on or turn off the fingerprint template update function. For example, the fingerprint template update option 804 shown in (4) in FIG. 7 is on.

Optionally, in addition to the fingerprint template update option 804, (4) in FIG. 7 may further include another control for fingerprint management. For example, (4) in FIG. 7 shows fingerprint use options, including: an option that the fingerprint is used to unlock the device, an option that the fingerprint is used to access an application lock, an option that the fingerprint is used for automatic filling with an account and a password, and an option that the fingerprint is used for quick payment with a wallet. For another example, (4) in FIG. 7 shows a fingerprint list management option, including a management control for a fingerprint 1, a management control for a fingerprint 2, a fingerprint addition option, and a fingerprint recognition option.

It should be understood that an application scenario in FIG. 7 is merely for ease of understanding by a person skilled in the art, and is not intended to limit this embodiment of this application to the specific scenario in FIG. 7.

The foregoing describes, in detail with reference to FIG. 1 to FIG. 7, the fingerprint recognition method provided in this embodiment of this application. The following describes an apparatus embodiment of this application in detail with reference to FIG. 8. It should be understood that a fingerprint recognition apparatus in this embodiment of this application may perform various fingerprint recognition methods in the foregoing embodiments of this application. In other words, for specific work processes of the following various products, refer to corresponding processes in the foregoing method embodiments.

Figure 8:
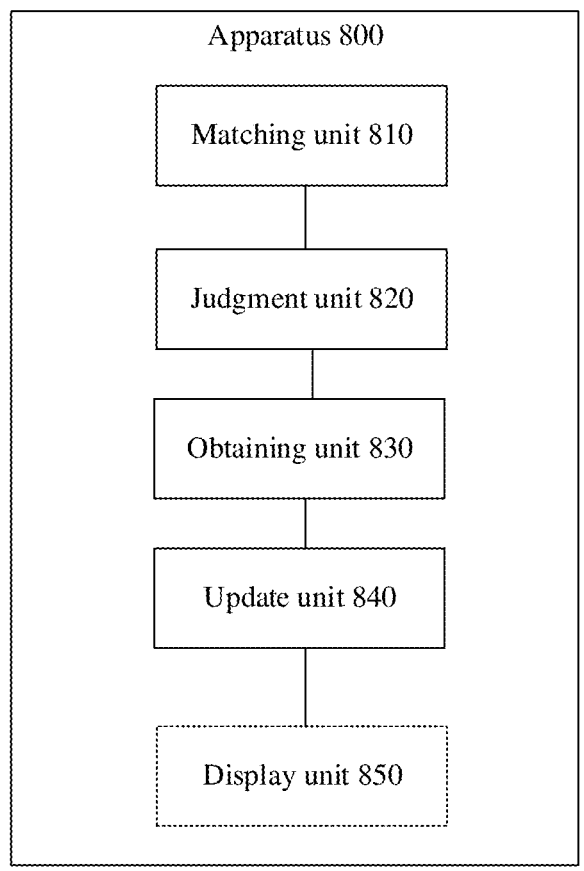
FIG. 8 is a schematic block diagram of a fingerprint recognition apparatus according to an embodiment of this application.

FIG. 8 is a schematic block diagram of a fingerprint recognition apparatus 800 according to an embodiment of this application. It should be understood that the apparatus 800 may perform the fingerprint recognition method shown in FIG. 4 to FIG. 7.

As shown in FIG. 8, the fingerprint recognition apparatus 800 includes a matching unit 810, a judgment unit 820, an obtaining unit 830, and an update unit 840. Optionally, the apparatus 800 further includes a display unit 850. In a possible example, the apparatus 800 may be a terminal device.

In an example, the matching unit 810 is configured to acquire a first fingerprint image, and match the first fingerprint image with a fingerprint template library.

The judgment unit 820 is configured to judge whether the first fingerprint image is successfully matched.

After the first fingerprint image is successfully matched, the obtaining unit 830 is configured to obtain matching information of the first fingerprint image. The matching information is used to represent a matching degree between the first fingerprint image and a first fingerprint template. The first fingerprint template is a fingerprint template that is in the fingerprint template library and that is successfully matched with the first fingerprint image.

The judgment unit 820 is further configured to determine whether the matching information satisfies a first preset condition.

The judgment unit 820 is further configured to: when the matching information satisfies the first preset condition, determine whether a first quantity is greater than a first quantity threshold. The first quantity is used to represent a cumulative update count of a second fingerprint template in the fingerprint template library.

The judgment unit 820 is further configured to: when the first quantity is greater than the first quantity threshold, judge whether priority information of the second fingerprint template satisfies a second preset condition.

When the priority information of the second fingerprint template satisfies the second preset condition, the obtaining unit 830 is further configured to obtain index information of the second fingerprint template.

The update unit 840 is configured to update the second fingerprint template with the first fingerprint image based on the index information of the second fingerprint template.

Optionally, in an embodiment, when the first quantity is greater than the first quantity threshold, the judgment unit 820 is further configured to determine whether a second quantity is less than or equal to a second quantity threshold. The second quantity is used to represent a recognition failure count of the first fingerprint image during fingerprint matching.

The judgment unit 820 is further configured to: when the second quantity is less than or equal to the second quantity threshold, determine whether a third quantity is less than a third quantity threshold. The third quantity is used to represent a total quantity of fingerprint templates currently stored in the fingerprint template library.

The update unit 840 is further configured to: when the third quantity is less than the third quantity threshold, add the first fingerprint image to the fingerprint template library.

Optionally, in an embodiment, the update unit 840 is further configured to: when the third quantity is greater than or equal to the third quantity threshold, update the second fingerprint template with the first fingerprint image.

Optionally, in an embodiment, the matching information includes a matching score, a matching area, and a quality score. Whether the matching information satisfies the first preset condition includes: the matching score is greater than a first score threshold, the matching area is greater than an area threshold, and the quality score is greater than a second score threshold.

Optionally, in an embodiment, that the priority information of the second fingerprint template satisfies the second preset condition includes:

a weight value of the second fingerprint template is greater than a weight threshold, a value obtained by automatically adding one to the first quantity is less than a fourth quantity threshold, and a matching success rate of the second fingerprint template is less than a ratio threshold. One is automatically added to the first quantity when whether the first quantity is greater than the first quantity threshold is determined.

Optionally, in an embodiment, a fingerprint template update function of the apparatus 800 is on.

Optionally, in an embodiment, the judgment unit 820 is further configured to perform real/fake finger anti-fake judgment on the first fingerprint image.

That the judgment unit 820 is configured to determine whether the matching information satisfies the first preset condition includes:

when the first fingerprint image is of a real finger, determining whether the matching information satisfies the first preset condition.

Optionally, in an embodiment, the display unit 850 is configured to display a first interface. The first interface includes a first option. The first option is used to select to turn on or turn off the fingerprint template update function.

In a possible example, the matching unit 810, the judgment unit 820, the obtaining unit 830, and the update unit 840 may be implemented by a processor or a processing unit. The display unit 850 may be implemented by a display. It should be understood that the apparatus 800 is embodied in a form of a function unit. The term "unit" herein may be implemented in a form of software and/or hardware. This is not specifically limited in this embodiment of this application.

For example, the "unit" may be a software program, a hardware circuit, or a combination thereof for implementing the foregoing functions. The hardware circuit may include an application specific integrated circuit (application specific integrated circuit, ASIC), an electronic circuit, a processor (for example, a shared processor, a dedicated processor, or a processor group) and a memory for executing one or more software or firmware programs, an integrated logic circuit, and/or another proper device capable of providing the foregoing functions. In a simple embodiment, a person skilled in the art may figure out that the apparatus 800 may use the form shown in FIG. 2.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

This application further provides a computer program product. When the computer program product is executed by a processor, the method in any method embodiment of this application is implemented.

The computer program product may be stored in a memory, and may be finally converted, after processing processes such as preprocessing, compiling, assembling, and linking, into an executable target file that can be executed by the processor.

This application further provides a computer-readable storage medium having a computer program stored thereon. When the computer program is executed by a computer, the method according to any method embodiment of this application is implemented. The computer program may be a high-level language program or an executable target program.

The computer-readable storage medium may be a volatile memory or non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not restrictive description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, a network device, or the like) to perform all or some of the steps of the method described in embodiments of this application. The storage medium includes any medium capable of storing program code, such as a USB flash drive, a removable hard disk, a read-only memory ROM, a random access memory RAM, a magnetic disk, or an optical disc.

It should be understood that in embodiments of this application, sequence numbers of the processes do not mean execution sequences. The execution sequences of the processes should be determined based on functions and internal logic of the processes, and should not be construed as any limitation on implementation processes of embodiments of this application.

In addition, the terms "system" and "network" in this specification may be used interchangeably in this specification. The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may indicate A or B.

The terms (or numbers) "first", "second", and the like that appear in embodiments of this application are merely used for the purpose of description, that is, used to distinguish between different objects, for example, different "fingerprints", and cannot be understood as an indication or implication of relative importance or an implicit indication of a quantity of indicated technical features. Therefore, a feature limited by "first", "second", and the like may explicitly or implicitly include one or more such features. In the descriptions of embodiments of this application, "at least one piece (item)" means one or more. "A plurality of" means two or more. "At least one piece (item) of the following" or a similar expression thereof means any combination of these items, including any combination of a single piece (item) or a plurality of pieces (items).

For example, unless otherwise specified, an expression such as "an item includes at least one of the following: A, B, and C" appearing in embodiments of this application usually means that the item may be any one of the following: A; B; C; A and B; A and C; B and C; A, B and C; A and A; A, A and A; A, A and B; A, A and C, A, and B and B; A, C and C; B and B, B, B and B, B, B and C, and C and C; and C, C and C, and another combination of A, B, and C. The three elements A, B, and C are used above as examples to illustrate an optional entry of the item. When the expression is "an item includes at least one of the following: A, B, . . ., and X", that is, when there are more elements in the expression, an applicable entry of the item may be obtained according to the foregoing rule.

In conclusion, the foregoing descriptions are merely example embodiments of the technical solutions of this application, and are not intended to limit the protection scope of this application. Any modification, equivalent replacement, and improvement made within the spirit and principle of this application shall fall within the protection scope of this application.

The invention claimed is:

1. A fingerprint recognition method, wherein the method is applied to an electronic device, and the method comprises:
    acquiring a first fingerprint image, and matching the first fingerprint image with a fingerprint template library;
    judging whether the first fingerprint image is successfully matched;
    after the first fingerprint image is successfully matched, obtaining matching information of the first fingerprint image, wherein the matching information is used to represent a matching degree between the first fingerprint image and a first fingerprint template, and the first fingerprint template is a fingerprint template that is in the fingerprint template library and that is successfully matched with the first fingerprint image;
    determining whether the matching information satisfies a first preset condition;
    when the matching information satisfies the first preset condition, determining whether a first quantity is greater than a first quantity threshold, wherein the first quantity is used to represent a cumulative update count of a second fingerprint template in the fingerprint template library;
    when the first quantity is greater than the first quantity threshold, judging whether priority information of the second fingerprint template satisfies a second preset condition;
    when the priority information of the second fingerprint template satisfies the second preset condition, obtaining index information of the second fingerprint template; and
    updating the second fingerprint template with the first fingerprint image based on the index information of the second fingerprint template,
    wherein, when the first quantity is greater than the first quantity threshold, the method further comprises:
    determining whether a second quantity is less than or equal to a second quantity threshold, wherein the second quantity is used to represent a recognition failure count of the first fingerprint image during fingerprint matching;
    when the second quantity is less than or equal to the second quantity threshold, determining whether a third quantity is less than a third quantity threshold, wherein the third quantity is used to represent a total quantity of fingerprint templates currently stored in the fingerprint template library; and
    when the third quantity is less than the third quantity threshold, adding the first fingerprint image to the fingerprint template library.

2. The method according to claim 1, wherein the method further comprises:
    when the third quantity is greater than or equal to the third quantity threshold, updating the second fingerprint template with the first fingerprint image.

3. The method according to claim 1, wherein the matching information comprises a matching score, a matching area, and a quality score; and whether the matching information satisfies the first preset condition comprises: the matching score is greater than a first score threshold, the matching area is greater than an area threshold, and the quality score is greater than a second score threshold.

4. The method according to claim 1, wherein that the priority information of the second fingerprint template satisfies the second preset condition comprises:
    a weight value of the second fingerprint template is greater than a weight threshold, a value obtained by automatically adding one to the first quantity is less than a fourth quantity threshold, and a matching success rate of the second fingerprint template is less than a ratio threshold, wherein one is automatically added to the first quantity when whether the first quantity is greater than the first quantity threshold is determined.

5. The method according to claim 1, wherein a fingerprint template update function of the electronic device is on.

6. The method according to claim 1, wherein the method further comprises:
    performing real/fake finger anti-fake judgment on the first fingerprint image; and
    the determining whether the matching information satisfies a first preset condition comprises:
    when the first fingerprint image is of a real finger, determining whether the matching information satisfies the first preset condition.

7. The method according to claim 1, wherein the method further comprises:
displaying a first interface, wherein the first interface comprises a first option, and the first option is used to select to turn on or turn off the fingerprint template update function.

8. A non-transitory, computer-readable storage medium, wherein the computer-readable storage medium stores a computer program, and when the computer program is executed by a processor, the processor is enabled to perform the method according to claim 1.

9. An electronic device, comprising a processor and a memory, wherein the processor and the memory are coupled, the memory is configured to store a computer program, and when the computer program is executed by the processor, the electronic device is enabled to perform operations comprising:
acquiring a first fingerprint image, and matching the first fingerprint image with a fingerprint template library;
judging whether the first fingerprint image is successfully matched;
after the first fingerprint image is successfully matched, obtaining matching information of the first fingerprint image, wherein the matching information is used to represent a matching degree between the first fingerprint image and a first fingerprint template, and the first fingerprint template is a fingerprint template that is in the fingerprint template library and that is successfully matched with the first fingerprint image;
determining whether the matching information satisfies a first preset condition;
when the matching information satisfies the first preset condition, determining whether a first quantity is greater than a first quantity threshold, wherein the first quantity is used to represent a cumulative update count of a second fingerprint template in the fingerprint template library;
when the first quantity is greater than the first quantity threshold, judging whether priority information of the second fingerprint template satisfies a second preset condition;
when the priority information of the second fingerprint template satisfies the second preset condition, obtaining index information of the second fingerprint template; and
updating the second fingerprint template with the first fingerprint image based on the index information of the second fingerprint template,
wherein, when the first quantity is greater than the first quantity threshold, the operations further comprise:
determining whether a second quantity is less than or equal to a second quantity threshold, wherein the second quantity is used to represent a recognition failure count of the first fingerprint image during fingerprint matching;
when the second quantity is less than or equal to the second quantity threshold, determining whether a third quantity is less than a third quantity threshold, wherein the third quantity is used to represent a total quantity of fingerprint templates currently stored in the fingerprint template library; and
when the third quantity is less than the third quantity threshold, adding the first fingerprint image to the fingerprint template library.

10. A chip, comprising a processor, wherein when the processor executes instructions, the processor performs operations comprising:
acquiring a first fingerprint image, and matching the first fingerprint image with a fingerprint template library;
judging whether the first fingerprint image is successfully matched;
after the first fingerprint image is successfully matched, obtaining matching information of the first fingerprint image, wherein the matching information is used to represent a matching degree between the first fingerprint image and a first fingerprint template, and the first fingerprint template is a fingerprint template that is in the fingerprint template library and that is successfully matched with the first fingerprint image;
determining whether the matching information satisfies a first preset condition;
when the matching information satisfies the first preset condition, determining whether a first quantity is greater than a first quantity threshold, wherein the first quantity is used to represent a cumulative update count of a second fingerprint template in the fingerprint template library;
when the first quantity is greater than the first quantity threshold, judging whether priority information of the second fingerprint template satisfies a second preset condition;
when the priority information of the second fingerprint template satisfies the second preset condition, obtaining index information of the second fingerprint template, and
updating the second fingerprint template with the first fingerprint image based on the index information of the second fingerprint template,
wherein, when the first quantity is greater than the first quantity threshold, the operations further comprise:
determining whether a second quantity is less than or equal to a second quantity threshold, wherein the second quantity is used to represent a recognition failure count of the first fingerprint image during fingerprint matching;
when the second quantity is less than or equal to the second quantity threshold, determining whether a third quantity is less than a third quantity threshold, wherein the third quantity is used to represent a total quantity of fingerprint templates currently stored in the fingerprint template library; and
when the third quantity is less than the third quantity threshold, adding the first fingerprint image to the fingerprint template library.

* * * * *